US005517329A

United States Patent [19]
Ishizuka

[11] Patent Number: 5,517,329
[45] Date of Patent: May 14, 1996

[54] CONTACT-TYPE IMAGE SENSOR HAVING AN ADHESIVE ELASTIC LAYER THEREIN

[75] Inventor: Haruo Ishizuka, Tokyo, Japan

[73] Assignee: Canon Kabushiki Kaisha, Tokyo, Japan

[21] Appl. No.: 83,395

[22] Filed: Jun. 29, 1993

Related U.S. Application Data

[63] Continuation of Ser. No. 721,696, Jun. 26, 1991, abandoned.

[30] Foreign Application Priority Data

| Jun. 29, 1990 | [JP] | Japan | 2-173203 |
| Jun. 29, 1990 | [JP] | Japan | 2-173204 |
| Jun. 29, 1990 | [JP] | Japan | 2-173205 |

[51] Int. Cl.⁶ .................. H04N 1/04; H04N 1/00
[52] U.S. Cl. ............. 358/474; 358/482; 358/296
[58] Field of Search ................... 358/296, 474, 358/482, 483, 498; 355/230, 231

[56] References Cited

U.S. PATENT DOCUMENTS

| 4,581,657 | 4/1986 | Takano | 358/482 |
| 4,723,129 | 2/1988 | Endo . | |
| 4,740,796 | 4/1988 | Endo . | |
| 4,805,032 | 2/1989 | Watanabe et al. | 358/482 |
| 4,839,730 | 6/1989 | Shirakoshi et al. | 358/483 |
| 4,908,711 | 3/1990 | Majima et al. | 358/474 X |
| 4,977,313 | 12/1990 | Nagata et al. | 358/482 X |
| 5,070,415 | 12/1991 | Matsumoto | 358/498 X |
| 5,121,225 | 6/1992 | Murata et al. | 358/482 X |
| 5,261,013 | 11/1993 | Murata et al. | 358/482 X |

*Primary Examiner*—Peter S. Wong
*Assistant Examiner*—Eric Frahm
*Attorney, Agent, or Firm*—Fitzpatrick, Cella, Harper & Scinto

[57] ABSTRACT

A contact-type image sensor having an adhesive elastic layer therein includes a protective member including a light transmitting area. An illumination device is provided for illuminating an original, bearing image information thereon, through the protective member. A photosensor device is provided for reading the image information, and imaging structure is provided for focusing light reflected from the original onto the photosensor device. Support structure is provided for integrally supporting the illumination device, the photosensor device, and the imaging structure. An elastic adhesive layer is provided on a contact surface between the protective member and the support structure. The elastic adhesive layer joins the protective member and the support structure.

45 Claims, 7 Drawing Sheets

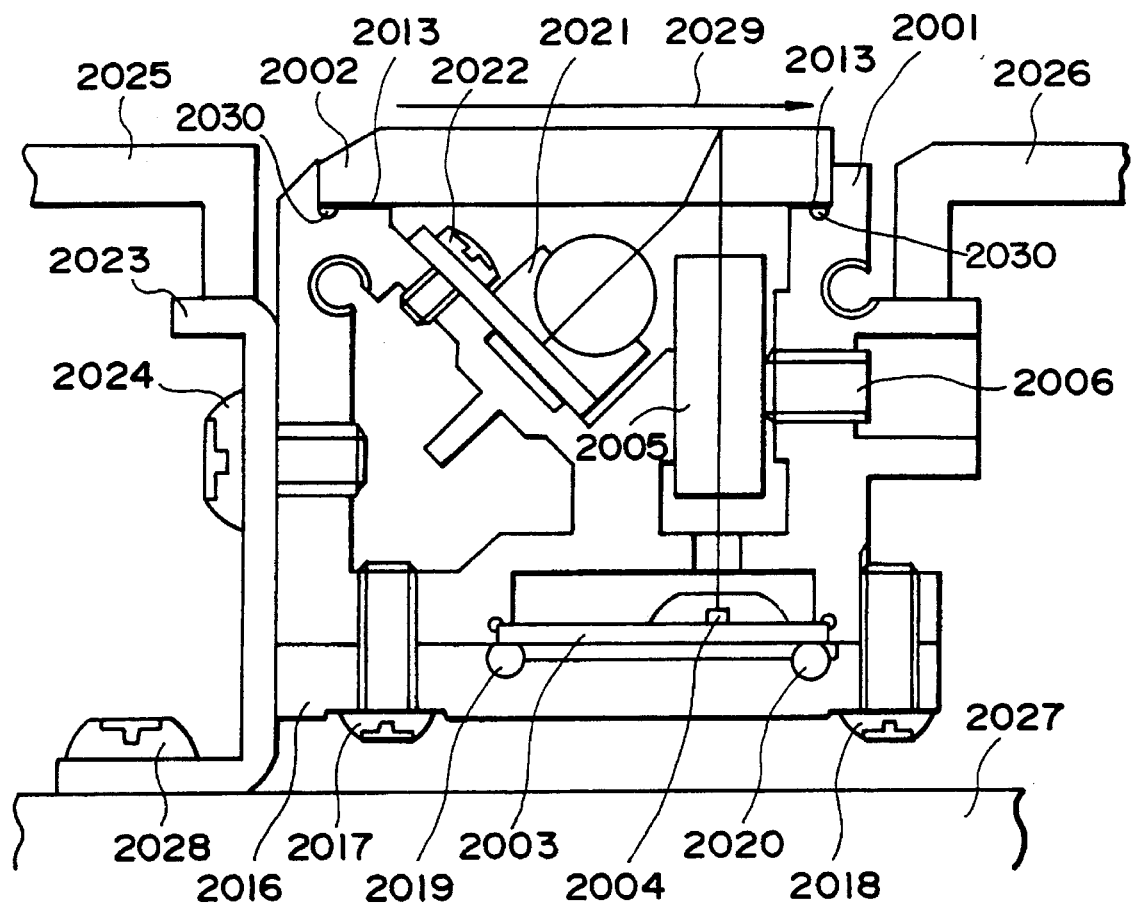
F I G. 3

CONTACT-TYPE IMAGE SENSOR HAVING AN ADHESIVE ELASTIC LAYER THEREIN

This application is a continuation, of application Ser. No. 07/721,696 filed Jun. 26, 1991, now abandoned.

BACKGROUND OF THE INVENTION

1. Field of the Invention

The present invention relates to a contact-type image sensor adapted for use in an image reading unit in an image reader, a facsimile machine, a copying machine or the like, and an information processing apparatus as mentioned above, utilizing said image sensor.

2. Related Background Art

FIG. 1A is a schematic lateral view of a contact-type image sensor, and FIG. 1B is a schematic lateral view showing a part of the image sensor in FIG. 1A, in a magnified manner.

In FIGS. 1A and 1B, there are shown a frame 151; an image reading glass 152; plate springs 153, 154; elastic members 155, 156; an optical system 157 such as a distributed refractive index lens; a sensor substrate 158; and a bottom plate 159.

As shown in FIGS. 1A and 1B, the image reading glass 152, constituting a transparent protective member, is supported on longitudinal ends thereof by the folded plate springs 153, 154 serving as lateral plates in such a manner that the image reading surface is pressed toward the frame 151 (direction indicated by an arrow aa). In order to avoid damage to glass 152 by said plate springs, elastic members 155, 156 such as rubber pieces are placed therebetween.

In the above-explained structure, however, there are often obtained different output signals from the same image, in the central and end portions thereof. This phenomenon is attributed principally to the unevenness in the illuminating light quantity, and has been resolved by shading correction or the like. However various experiments and investigations by the present inventors have revealed that certain cases cannot be satisfactorily resolved by shading correction alone.

More specifically, some of the problems arise from the mounting method of the image reading glass. Though said glass is pressed by the lateral plates at the ends, it becomes bent by contact at the rear side with a hollow part of the frame and tends to be lifted in the central part, whereby the flatness of said glass is sometimes deteriorated to reduce the focus margin.

Also, the above-explained structure, in which the lateral plates protrude above the reading face of said glass, is associated with drawbacks such that an original document wider than the frame length cannot be passed and that even an original document narrower than the frame length may engage with the protruding portion of the lateral plate, thus eventually resulting in a sheet jamming if said original document is skewed in movement.

Furthermore, the contact between the image reading glass and the frame is often unstable, and dirt such as paper powder may intrude into the gap between said glass and the frame, causing an undesirable influence on the image reading operation.

SUMMARY OF THE INVENTION

In consideration of the technical drawbacks of the prior known technology explained above, an object of the present invention is to provide a contact image sensor capable of producing satisfactory image reading regardless of the ambient conditions, and an information processing apparatus utilizing said image sensor.

Another object of the present invention is to provide a contact image sensor with a enhanced reading precision, capable of preventing breakage of a protective member, and an information processing apparatus utilizing said image sensor.

Still another object of the present invention is to provide a contact image sensor capable of preventing bending of a protective member with an extremely simple structure, thereby providing an extremely high reading precision, and an information processing apparatus utilizing said image sensor.

Still another object of the present invention is to provide a contact image sensor provided with a protective member having a light transmitting part, illumination means for illuminating an original, bearing image information thereon, through said protective member, a photosensor device for reading said image information, imaging means for focusing the light reflected from said original onto said photosensor device, and support means for integrally supporting said illumination means, said photosensor device and said imaging means, wherein an adhesive layer having elasticity is provided for adhering said protective member with said support means, at the contact face therebetween.

Still another object of the present invention is to provide an information processing apparatus provided with a contact image sensor, having a protective member including a light transmitting part, illumination means for illuminating an original, bearing image information thereon, through said protective member, a photo sensor device for reading said image information, imaging means for focusing the light reflected from said original onto said photosensor device, and support means for integrally supporting said illumination means, said photosensor device and said imaging means, wherein an adhesive layer having elasticity is provided for adhering said protective member with said support means at the contact face therebetween; original support means for supporting said original at a reading position; sensor driver means for driving said contact image sensor; and sensor support means for supporting said contact image sensor in fixed or movable manner.

Still another object of the present invention is to provide a contact image sensor provided with a protective member including a light transmitting part, illumination means for illuminating an original, bearing image information thereon, through said protective member, a photosensor device for reading said image information, imaging means for focusing the light reflected from said original onto said photosensor device, and support means for integrally supporting said illumination means, said photosensor device and said imaging means, wherein a part of said protective member other than the image reading face thereof is adhered to said support means, at least an end portion of said protective member other than the image reading face thereof is adhered to a lateral plate mounted on an end portion of said support means, and said lateral plate has elasticity in a direction for absorbing deformation of said protective member at least in a direction connecting two points of said adhesion.

Still another object of the present invention is to provide an information processing apparatus provided with a contact image sensor having a protective member including a light transmitting part, illumination means for illuminating an original, bearing image information thereon, through said protective member, a photosensor device for reading said image information, imaging means for focusing the light reflected from said original onto said photosensor device, and support means for integrally supporting said illumination means, said photosensor device and said imaging means, wherein a part of said protective member other than the image reading face thereof is adhered to said support means, at least an end portion of said protective member other than the image reading face thereof is adhered to a lateral plate mounted on an end portion of said support means, and said lateral plate has elasticity in a direction for absorbing deformation of said protective member at least in a direction connecting two points of said adhesion; original support means for supporting said original in a reading position; sensor driver means for driving said contact image sensor; and sensor support means for supporting said contact image sensor in fixed or movable manner.

Still another object of the present invention is to provide a contact image sensor provided with a protective member including a light transmitting part, illumination means for illuminating an original, bearing image information thereon, through said protective member, a photosensor device for reading said image information, imaging means for focusing the light reflected from said original onto said photosensor device, and support means for integrally supporting said illumination means, said photosensor device and said imaging means, wherein said protective member and said support means are mutually adhered at the central and both end parts in the longitudinal direction of said protective member.

Still another object of the present invention is to provide an information processing apparatus provided with a contact image sensor having a protective member including a light transmitting part, illumination means for illuminating an original, bearing image information thereon, through said protective member, a photosensor device for reading said image information, imaging means for focusing the light reflected from said original onto said photosensor device, and support means for integrally supporting said illumination means, said photosensor device and said imaging means, wherein said protective member and said support means are mutually adhered at the central and both end parts in the longitudinal direction of said protective member; original support means for supporting said original in a reading position; sensor driver means for driving said contact image sensor; and sensor support means for supporting said contact image sensor in fixed or movable manner.

BRIEF DESCRIPTION OF THE DRAWINGS

FIG. 3 is a schematic cross-sectional view of a contact image sensor embodying the present invention;

DESCRIPTION OF THE PREFERRED EMBODIMENTS

Figure 1A:
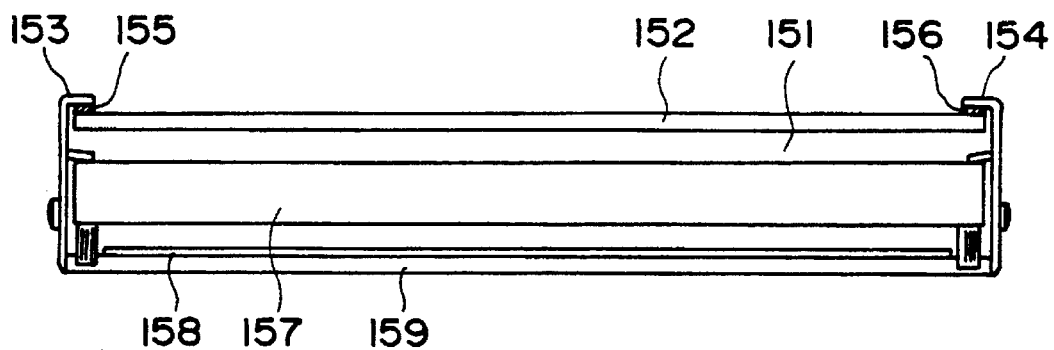
FIGS. 1A and 1B are schematic lateral views of a contact image sensor.
Figure 1B:
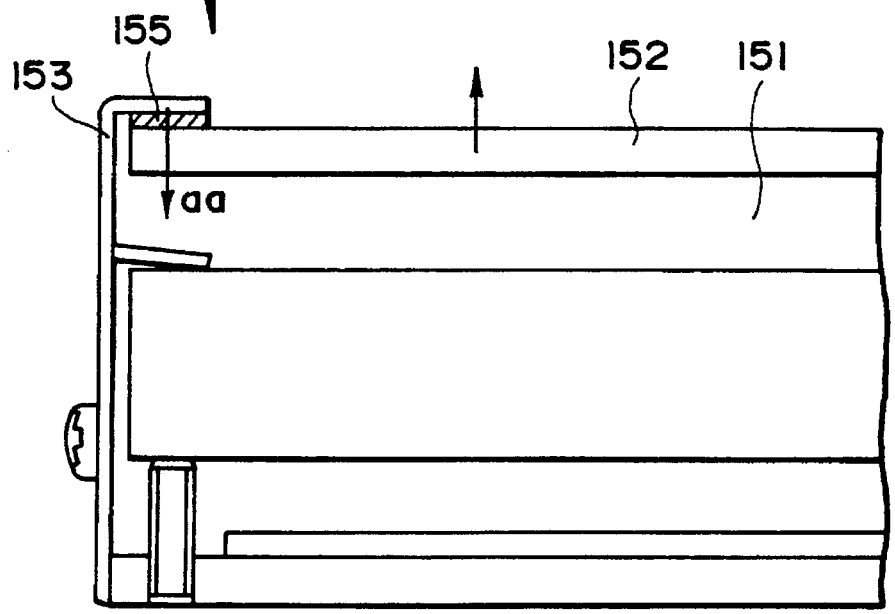
Figure 2A:
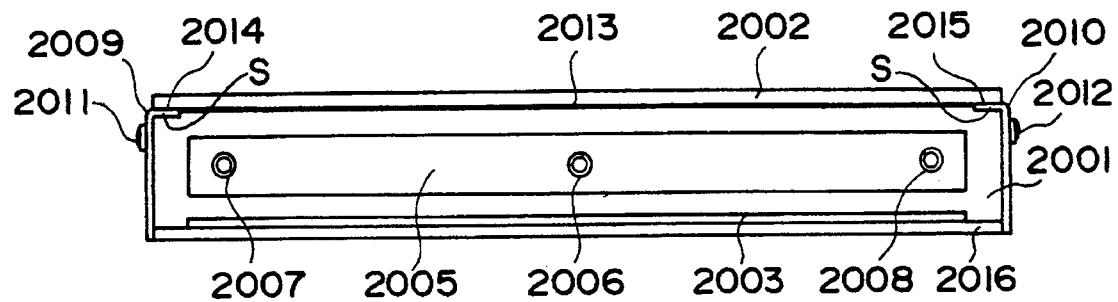
FIGS. 2A and 2B are schematic lateral views of a contact image sensor embodying the present invention.
Figure 2B:
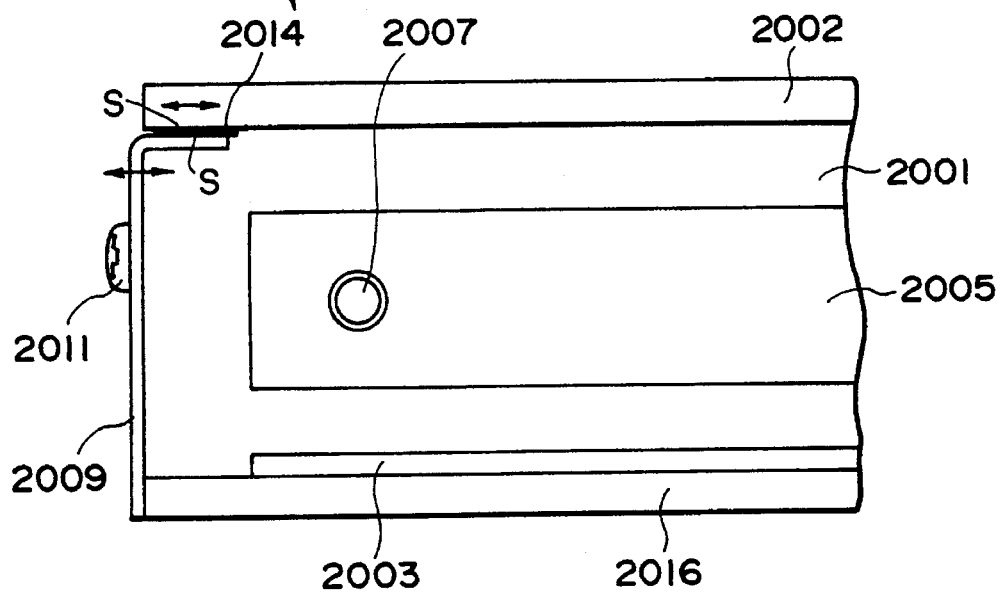
Figure 4:
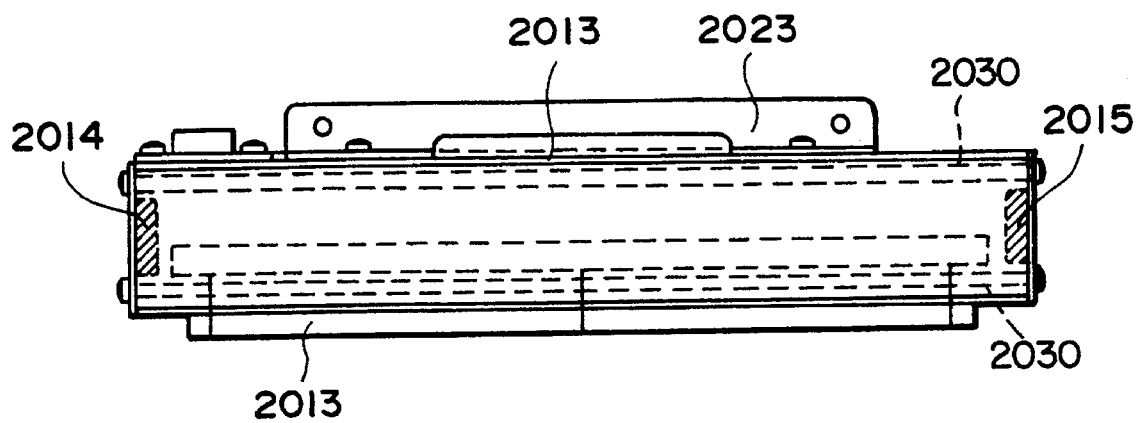
FIG. 4 is a schematic plan view of said contact image sensor.

In brief, the present invention is intended to resolve the aforementioned drawbacks of the contact image sensor, by adhering all the contact face between the protective member and the support means with an adhesive layer having suitable elasticity, thereby absorbing the deformation of the protective member and thus preventing the bending of the protective member or the image sensor.

Also the present invention is intended to resolve the aforementioned drawbacks of the contact image sensor by employing a structure in which a part of the protective member other than the image reading face thereof is adhered to the support means, and at least an end portion of the protective member other than the image reading face thereof is adhered to an end of the support means or to a lateral plate mounted on an end of the support means, thereby further enabling absorption of the deformation of the protective member.

Also the present invention is intended to resolve the aforementioned drawbacks of the contact image sensor by employing a structure in which the protective member and the support means are mutually adhered to each other in the central part and both end parts in the longitudinal direction of said protective member, and the deformation of the protective member is absorbed by an adhesive layer having suitable elasticity or by a lateral face of the support means having elasticity.

Also the present invention may adopt, when necessary, suitable combinations of the structures briefly explained in the foregoing.

The present invention can provide a contact image sensor capable of resolving the various technical drawbacks explained before, and an information processing apparatus utilizing said image sensor.

Besides, the present invention will prevent breakage in the protective member or damage in the image sensor or in the information processing apparatus.

Furthermore, the present invention will attain the aforementioned objects without relying on complex structures, thereby facilitating design and manufacture, and achieving overall cost reduction.

Furthermore, the present invention will produce an image sensor capable of image reading with an extremely high precision, and an information processing apparatus employing such an image sensor.

Now, the present invention will be clarified in greater detail by preferred embodiments thereof shown in the attached drawings.

In a preferred embodiment of the present invention, an adhesive layer with elasticity is provided in the contact face between the protective member and the support means, for mutually adhering these components to each other.

The adhesive layer adapted for use in the present invention is only required to have a suitable elasticity when finally installed between the protective member and the support means, and the elasticity, of the adhesive layer in the course of manufacturing the sensor is irrelevant.

Based on the experimental results of the present inventors, the elasticity of the adhesive layer is preferably such that the amount of deformation (while the protective member and the support means are maintained in an adhered state) is at least about M per 1 cm of the longitudinal length of the protective member used, wherein M is defined by:

$$M=|\alpha 1-\alpha 2|\times 1000$$

and α1, α2 are linear expansion coefficients of materials respectively constituting the protective member and the support means at the mutually adhered part.

Such conditions ensure satisfactory outputs.

When the protective member and the support means are respectively composed of glass and aluminum, the elasticity of the adhesive layer is preferably at least ca. 0.016 mm per 1 cm of the longitudinal length of the protective member employed, more preferably at least 0.019 mm, or more preferably at least 0.024 mm in consideration of eventual fluctuations, and most preferably at least 0.026 mm in consideration of a safety factor. The use of such an adhesive layer will to reduce the deformation (bending) of the protective member to a level ensuring satisfactory output signals.

More specifically, for a protective member of a length of 280 mm (28 cm) for reading B4 size originals, there is preferably employed an adhesive layer with an elasticity allowing a deformation of at least 0.448 mm.

The adhesive material constituting said adhesive layer may be of one- or two-component type, and examples of such adhesive include polysulfide adhesives, silicone adhesives, polyurethane adhesives, chlorosulfonated polyethylene adhesives, butyl rubber adhesives and acrylic rubber adhesives.

Also, said adhesive layer need not necessarily be composed of a single layer but can be composed of multiple layers as long as the above-mentioned conditions are satisfied, and, in such a case, the elasticity may be provided in at least a part of said multiple layers. More specifically, the adhesive layer of the present invention may be composed of an adhesive material itself, or of a three-layered structure including a substrate material between two adhesive layers as in a two-sided adhesive tape.

In such a case, the elasticity may be provided in the adhesive material and/or the substrate material. As an example, a multi-layered structure such as of a double-sided sponge tape (in which an elastic substrate (sponge in this case) is sandwiched between two adhesive layers) is also included in the adhesive layer of the present invention. The substrate is naturally not limited to sponge but can also be composed of an elastic member such as rubber.

In another preferred embodiment of the present invention, there are provided a protective member and support means, wherein a part of said protective member other than the image reading face thereof is adhered to said support means, at least an end portion of said protective member other than the image reading face thereof is adhered to a lateral plate mounted on an end portion of said support means, and said lateral plate has elasticity in a direction for absorbing the displacement of said protective member at least in a direction connecting two points of said adhesion.

Based on the experimental results of the present inventors, the elasticity of the lateral plate is preferably such that the amount of deformation (while the protective member and the support means are maintained in an adhered state) is at least about M per 1 cm of the longitudinal length of the protective member used, wherein M is defined by:

$$M=|\alpha 1-\alpha 2|\times 1000$$

and α1, α2 are linear expansion coefficients of materials respectively constituting the protective member and the lateral plate.

Such conditions ensure satisfactory outputs.

When the protective member and the support means are respectively composed of glass and aluminum, the elasticity is preferably at least ca. 0.016 mm per 1 cm of the longitudinal length of the protective member employed, more preferably at least 0.019 mm, or more preferably at least 0.024 mm in consideration of eventual fluctuations, and most preferably at least 0.026 mm in consideration of a safety factory. The use of such a lateral plate will reduce the deformation (bending) of the protective member to the level ensuring satisfactory output signals.

More specifically, for a protective member of a length of 280 mm (28 cm) for reading B4 size originals, there is preferably employed a lateral plate with an elasticity allowing a deformation of at least 0.448 mm.

In case the glass is fixed by an adhesive layer at the center or in the vicinity thereof and the deformation is absorbed by an elastic adhesive layer at both ends, there is only required a half deformation of 0.224 mm, so that there can be obtained an enlarged freedom in designing the material or structure of the lateral plate.

The adhesive material for forming the adhesive layer with elasticity may be of a one- or two-component type as explained above, and examples of such adhesive materials include polysulfide adhesives, silicone adhesives, polyurethane adhesives, chlorosulfonated polyethylene adhesives, butyl rubber adhesives and acrylic rubber adhesives.

For the adhesion of the lateral plate to the protective member, particularly preferred is an epoxy resin adhesive, an emulsion adhesive, a cyanoacrylate adhesive, a polyurethane adhesive, an acrylic resin adhesive or a synthetic rubber adhesive.

Also, as explained above, the adhesive layer need not necessarily be composed of a single layer but can be composed of multiple layers as long as the above-mentioned conditions are satisfied, and, in such a case, the elasticity may be provided in at least a part of said multiple layers. Also, there may be employed, as explained above, a three-layered adhesive layer in which an elastic member is sandwiched between two adhesive layers, as in a double-sided sponge tape.

In still another embodiment of the present invention, the protective member and the support means are mutually adhered at the center of said protective member in the longitudinal direction thereof and the protective member is also adhered at both ends, by an adhesive layer, with elasticity, to said support means or to elastic members of said support means, whereby elasticity is provided in a direction for absorbing the deformation of said protective member in a direction connecting the adhered positions at both ends.

Based on the experimental results of the present inventors, the elasticity of the adhesive layer or the lateral plate is preferably such that the amount of deformation (while the protective member and the support means are maintained in an adhered state) is at least about M per 1 cm of the longitudinal length of the protective member used, wherein M is defined by:

$$M=|\alpha 1-\alpha 2|\times 1000$$

and α1, α2 are linear expansion coefficients of materials respectively constituting the protective member and the support means.

Such conditions ensure satisfactory outputs.

When the protective member and the support means are respectively composed of glass and aluminum, the elasticity is preferably at least ca. 0.008 mm per 1 cm of the longitudinal length of the protective member employed, more preferably at least 0.009 mm, or more preferably at least 0.012 mm in consideration of eventual fluctuations, and most preferably at least 0.013 mm in consideration of a safety factor. The use of such a lateral plate will to reduce the deformation (bending) of the protective member to a level ensuring satisfactory output signals.

More specifically, for a protective member of a length of 280 mm (28 cm) for reading B4 size originals, there is preferably employed a lateral plate with an elasticity allowing a deformation of at least 0.224 mm. Thus, there is obtained a widened freedom for designing the material or structure of the lateral plate of the support means or designing the adhesive layer.

Also, in this case the adhesive material for forming the adhesive layer with elasticity may be of a one- or two-component type, and examples of such adhesive materials include polysulfide adhesives, silicone adhesives, polyurethane adhesives, chlorosulfonated polyethylene adhesives, butyl rubber adhesives and acrylic rubber adhesives.

For the adhesion of the lateral plate to the protective member, particularly preferred is an epoxy resin adhesive, an emulsion adhesive, a cyanoacrylic adhesive, a polyurethane adhesive, an acrylic resin adhesive or a synthetic rubber adhesive.

The adhesive layer need not necessarily be composed of a single layer but can be composed of multiple layers as long as the above-mentioned conditions are satisfied, and, in such a case, the elasticity may be provided in at least a part of said multiple layers. More specifically, as explained above, there may be employed a three-layered structure in which an elastic member is sandwiched between two adhesive layers, as in a double-sided sponge tape.

In the foregoing embodiments, the adhered part is positioned on a face of the image reading glass opposite to the reading face thereof, but it may also be positioned on the lateral end face of the glass.

Also, the protective member need not be composed of glass but may also be composed of a resinous material or a molded resin such as transparent acrylic resin.

In the following there will be explained embodiments of the present invention, with reference to the attached drawings.

[Embodiment 1]

FIGS. 2A, 2B, 3 and 4 illustrate a contact image sensor constituting a first embodiment of the present invention, respectively in a schematic lateral view, a schematic magnified view of a part in the vicinity of a lateral plate, a schematic cross-sectional view and a schematic plan view.

Referring to these drawings, a frame 2001 constituting support means is obtained by shaping a drawn material of an aluminum alloy, and is preferably subjected to a black almite treatment in order to prevent undesirable influence on the internal optical system and eventual change in the surface state thereof.

There are also shown an image reading glass 2002 constituting a protective member with a light transmitting area; a photosensor device 2004 serving as a photoelectric converter and provided on a sensor substrate 2003; an actual-size lens array 2005 serving as imaging means and fixed on the frame by fixing screws 2006, 2007, 2008; lateral plates 2009, 2010 fixed on the frame 2001 by means of fixing screws 2011, 2012; adhesive layers 2013, 2014, 2015 for the image reading glass; a bottom plate 2016 fixed to the frame 2001 by fixing screws 2017, 2018; rubber shafts 2019, 2020 for fixing the sensor substrate; and an LED array 2021 serving as illumination means, composed of plural LED chips as the light source and a cylindrical lens as the light condensing means mounted on a board, and fixed on the frame 2001 by means of fixing screws 2022.

Such a contact image sensor is mounted on the main body 2027 of the apparatus by means of a metal mounting plate 2023, mounting plate fixing screws 204 and sensor fixing screws 2028 constituting sensor support means. Also, an original guide 2025 of the mounting plate side and an original guide 2026 of the lens side are mounted on the main body of the apparatus, and an original 2029 is transported in a direction as shown by the arrow. In case of a scanning sensor, there is employed movable sensor support means such as a carriage.

Adhesive layers 2013, 2014, 2015 are respectively provided over the entire contact face between the frame 2001 and the image reading glass 2002, and on the contact faces between said glass 2002 and lateral plates 2009, 2010, thereby fixing these components.

The bottom plate 2016 is formed by shaping a pressed member of an aluminum alloy as explained before, subjected to almite treatment for preventing change in the surface state thereof, and presses the rubber shafts 2019, 2020 for fixing the sensor substrate, fixed for example by adhesion to said bottom plate 2016, thereby fixing the sensor substrate 2003 by a pressing force.

In the following there will be explained the image reading operation. The original 2029 smoothly slides to the image reading glass 2002 along the original guide 2025 of the mounting plate side, and smoothly slides out from said glass 2002 along the original guide 2026 of the lens side. On the image reading glass 2002, a face of the original 2029 facing said glass 2002 is illuminated by a light beam emitted by the LED array, and the image of said original is focused by the lens array 2005 onto the photosensor device 2004. An image signal, obtained by photoelectric conversion in said photosensor device 2004, is amplified on the substrate 2003 and released to the exterior.

The present embodiment 1 is featured by the following structures. The contact between the leading glass 2002 and the frame 2001, and the contact faces between said glass and the lateral plates 2009, 2010 mounted on the ends of the frame 2001 are all adhered by adhesive layers with elasticity, composed of an incompletely solidifiable adhesive material. The adhesive of such incomplete solidification is exemplified by a silicone resin adhesive, which does not completely harden but shows certain elasticity even after adhesion. When the image reading glass 202 expands or shrinks, for example, by a temperature change, with respect to the frame 2001, the stress resulting from the movement of said glass 2002 is absorbed by the deformation of the adhesive layers. It is therefore possible to prevent the breakage of the image reading glass 2002 by an excessive stress thereon, and the lifting of said glass 2002 from the frame 2001.

Also, since there are no protruding portions above the reading face of the image reading glass, an original wider than the frame length may also be freely passed, and a larger tolerance is obtained for skewed advancement of an original the width of which is narrower than but close to the frame length. Furthermore, in the embodiment 1, the frame 2001 is provided with a recess or a groove 2030, which provides the advantages of reducing the overflowing of the adhesive material even if it is used in excess at the adhesion, increasing the area of adhesion thereby correspondingly increasing the durability, and suppressing the intrusion of dusts such as paper powder.

Said recess in the frame may be continuous as a groove or discontinues, and may be arbitrary in shape. Also, said recess may be provided in the image reading glass or in the lateral plates, or in all of the frame, image reading glass and lateral plates, and such recesses are preferably formed in a well-balanced manner.

[Embodiment 2]

Figure 5:
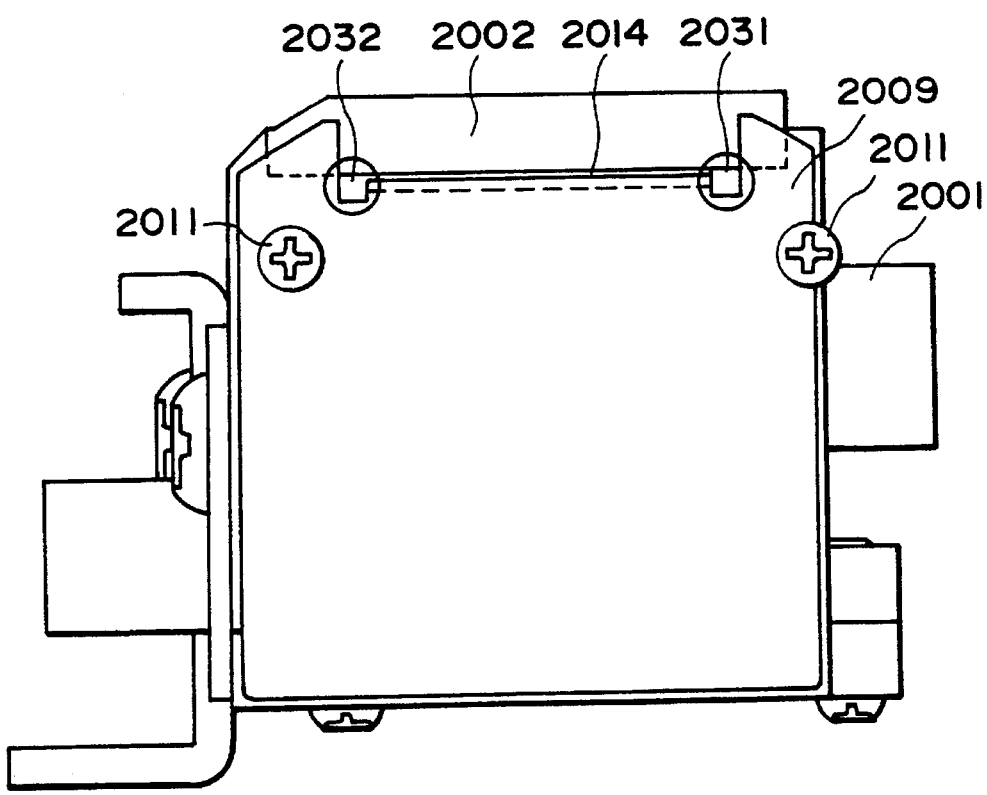
FIG. 5 is a schematic lateral view of a contact image sensor constituting another embodiment of the present invention.

In the embodiment 1, as shown in FIG. 5, there may be generated gaps 2031, 2032 between the image reading glass 2002 and the frame 2001 or the lateral plates 2009, 2010, due to eventual bending of the lateral plates or fluctuation in the dimensions of the component parts.

In the present embodiment 2, said gaps 2031, 2032 are filled with an incompletely solidifiable filler, whereby deterioration of the image resulting from intrusion of dusts such as paper powder into the frame 2001 through the gaps around the image reading glass can be prevented, without hindrance of movement of the image reading glass 2002 resulting from expansion or shrinkage thereof.

Other structures and advantages of the present embodiment are the same as those in the embodiment 1, and are therefore not explained further.

[Embodiment 3]

In the present embodiment 3, the adhesive material of incomplete solidification employed in the adhesion of the image reading glass 2002 is also used as a filler for filling the gaps 2031, 2032. Such a use of adhesive material further avoids complication in the assembly process works resulting from the use of another filler, thus leading to a further cost reduction.

Other structures and advantages are the same as those in the foregoing embodiment 2 and will not, therefore, be explained further.

The contact image sensor unit explained above can be utilized in various information processing apparatus such as a facsimile apparatus, an image reader or the like.

Figure 6:
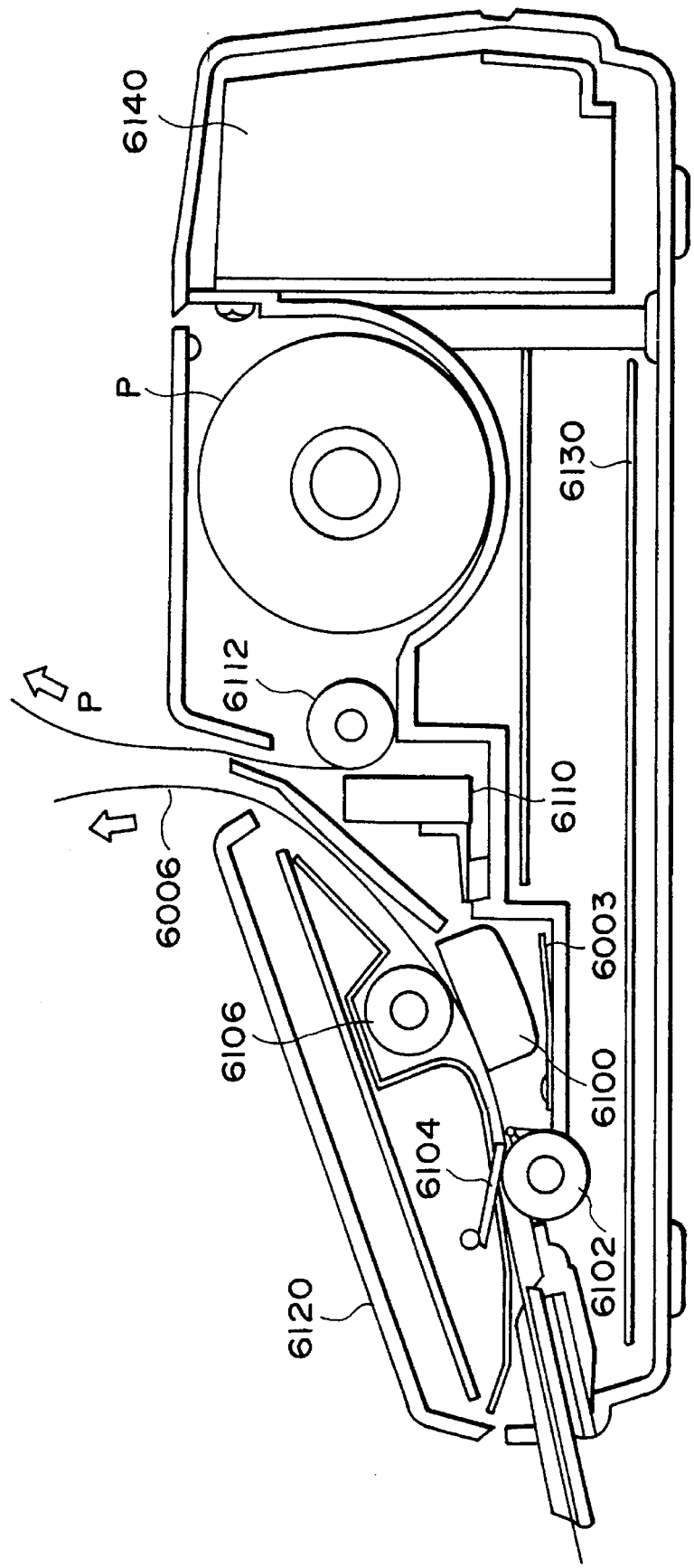
FIG. 6 is a schematic cross-sectional view of an information processing apparatus provided with the contact image sensor of the present invention.

FIG. 6 shows a facsimile apparatus with a communicating function, as an example of the image information processing apparatus utilizing the image sensor unit of the present invention, wherein shown are a feed roller 6102 for feeding an original 6006 to a reading position; a separating plate 6104 for securely separating the originals one by one; and a platen roller 6106 serving as original support means provided at the reading position opposite to the image sensor unit thereby defining the image reading plane of the original 6006 and also serving to transport said original 6006.

Recording medium P, formed as a rolled sheet in the illustrated example, is used for reproducing the image information which is read by the image sensor unit or is transmitted from the outside in case of facsimile communication. A recording head 6110, serving as the recording means for image formation, can be of various types, such as a thermal head or an ink jet recording head. Said recording head can be of the serial type or the line type. A platen roller 6112 constitutes transport means for transporting the recording medium P to the recording position near the recording head 6110 and defining the recording plane of said recording medium.

An operation panel 6120 constitutes input/output means, provided with switches for entering various instructions, and display units for indicating the state of the apparatus by messages or otherwise.

A system control board 6130 constitutes control means, provided for example with sensor driver means for driving the image sensor, a controller for controlling various units, a drive circuit for the photosensor device, an image information processor, a transmitter-receiver unit etc. Also, there is provided a power source 6140 for the apparatus.

The recording means to be employed in the information processing apparatus of the present invention is preferably of the so-called bubble jet recording method, the principle and representative structures of which are disclosed for example in the U.S. Pat. Nos. 4,723,129 and 4,740,796. In this method, an electrothermal converting member positioned corresponding to a liquid path or a liquid (ink)-holding sheet is given at least a drive signal corresponding to the recording information and which induces a rapid temperature increase exceeding the boiling the liquid, thus paint generating thermal energy, whereby film boiling is caused on the heat action surface of the recording head, and a bubble is generated in the liquid (ink) corresponding one-to-one to said drive signal. Said liquid (ink) is discharged from an opening by the expansion and shrinkage of said bubble, thereby forming at least a droplet.

A full-line type recording head of a length corresponding to the maximum width of the recording medium recordable on the recording apparatus may be obtained by a combination of plural recording heads as disclosed in the above-mentioned patents, or by an integral recording head.

The present invention is furthermore effective for a replaceable recording head of the chip type which can be electrically connected with and can receive ink supply from the main body of the apparatus when mounted therein, or a recording head of the cartridge type which integrally incorporates an ink cartridge therein.

[Embodiment 4]

Figure 7A:
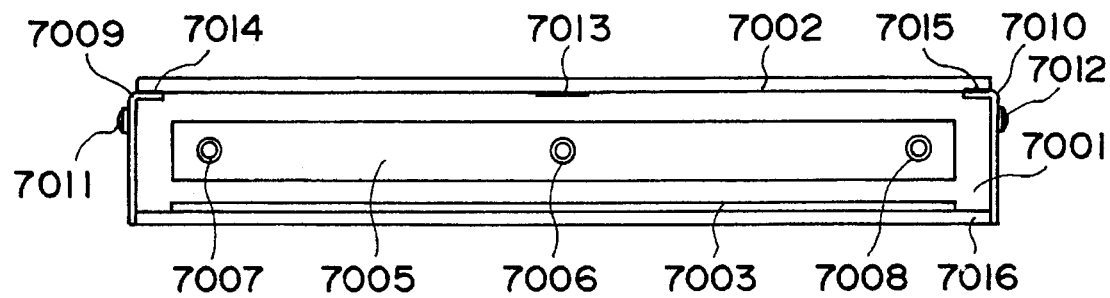
FIGS. 7A and 7B are schematic lateral views of a contact image sensor constituting still another embodiment of the present invention.
Figure 7B:
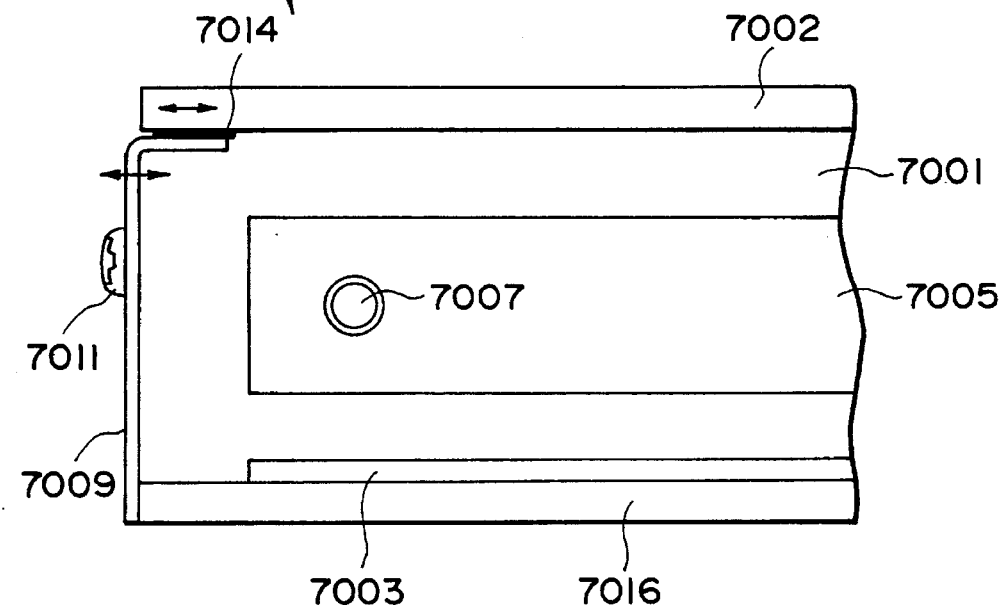

FIGS. 7A and 7B illustrate a fourth embodiment of the contact image sensor of the present invention, respectively in a schematic lateral view and a magnified view in the vicinity of a lateral plate. The cross-sectional view of the present embodiment will be omitted, since it is similar to FIG. 3. In FIGS. 7A and 7B, the same components as those in FIG. 3 are represented by corresponding numbers of 7000's, instead of 2000's.

The structure of the present fourth embodiment is featured as follows.

The adhesive layers 7013, 7014, 7015 are composed of a completely solidifiable adhesive material which completely fixes the image reading glass 7002 to the mating components. The lateral plates 7009, 7010 are composed of elastic plate springs. When the image reading glass 7002 expands or shrinks with respect to the frame 7001 for example by a temperature change, said expansion or shrinkage occurs with respect to the adhesion point by the adhesive layer 7013, and the stress resulting from the movement of end portions of the glass 7002 is absorbed by bending of the lateral plates 7009, 7010. Thus there can be prevented the destruction of the image reading glass 7002, resulting from excessive stress thereon.

Also, since there are no protruding portions above the reading face of the image reading glass, an original wider than the frame length may also be freely passed, and a larger tolerance is obtained for skewed advancement of an original the width of which is narrower than but close to the frame length. Furthermore, in the present embodiment 4, the frame 7001 is provided with a recess or a groove 7030, which provides the advantages of reducing the overflowing of the adhesive material even if it is used in excess at the adhesion, increasing the area of adhesion thereby correspondingly improving the durability, and suppressing the intrusion of dusts such as paper powder.

Said recess in the frame may be continuous as a groove or discontinuous, and may be arbitrary in shape. Also, said recess may be provided in the image reading glass or in the lateral plates, or in all of the frame, image reading glass and lateral plates, and such recesses are preferably formed in a well-balanced manner.

[Embodiment 5]

The adhesive layers 7013, 7014, 7015 for the image reading glass are composed of an incompletely solidifiable adhesive material, exemplified by a silicone resin adhesive which does not harden completely but retains certain elasticity even after adhesion. When the glass 7002 expands or shrinks with respect to the frame 7001, for example by a temperature change, the stress resulting from the movement of said glass 7002 is absorbed by the deformation of said adhesive layers 7013, 7014, 7015. Thus, there can be prevented destruction of the image reading glass 7002 resulting from an excessive stress thereon.

Other structures, being the same as those in the embodiment 4, will not be explained further.

[Embodiment 6]

Among the adhesive layers 7013, 7014, 7015 in the embodiment 5, one may be composed of a completely solidifiable adhesive material without trouble, since the stress resulting from the movement of the image reading glass 7002 can be absorbed by two other adhesive layers. Such structure will to prevent the displacement of the entire glass 7002.

Other structures, being the same as those in the embodiment 4, will not be explained further.

[Embodiment 7]

In the structures of the embodiments 4 to 6, the image reading glass 7002 can be biased toward the frame 7001 by the elasticity of the adhesive layers 7013, 7014, 7015, by constituting said adhesive layer with an adhesive material which shrinks at hardening in adhesion or by fixing the lateral plates, after adhesion, in a state biased toward the frame 7001. Such structure reduces the lifting of the reading glass 7002 from the frame 7001, as said glass is pressed against the frame.

Other structures, being the same as in the embodiment 4, will not be explained further.

[Embodiment 8]

In the structures in the embodiments 4 to 7, the adhesive layer 7013 for fixing the image reading glass 7002 to the frame 7001 is positioned at the center of said frame 7001. In such a structure, the amount of expansion or shrinkage of the image reading glass at the positions of two other adhesive layers, with respect to the position of the adhesive layer 7013, becomes balanced. Thus, if the expansion or shrinkage is uniform over the entire glass, there is required less absorption of the stress by elasticity, so that the destruction of the glass by stress can be avoided with a material of relatively limited elastic deformation.

Other structures, being the same as in the embodiment 4, will not be explained further.

[Embodiment 9]

Figure 8:
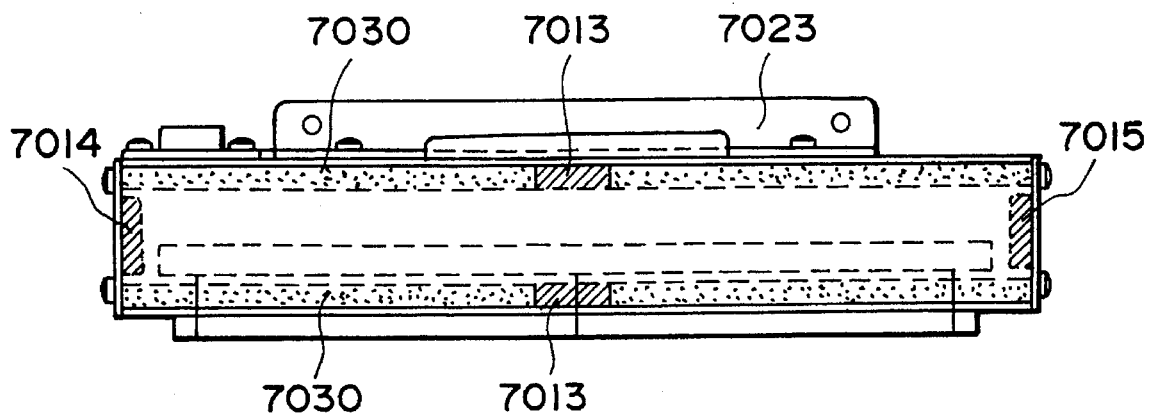
FIG. 8 is a schematic plan view of said contact image sensor.

In the structures in the embodiments 4 to 8, the contact face corresponding to the groove 7030 between the frame 7001 and the image reading glass 7002, other than the positions of the adhesive layers 7013, 7014, 7015, is adhered with an adhesive material of a weak adhering force, such as rubber glue as shown in FIG. 8. Because of its weak adhering force, said adhesive material does not hinder the movement of the image reading glass 7002 by expansion or shrinkage thereof. Such structure will to prevent undesirable effects on the image resulting from intrusion of dusts such as paper powder into the frame 7001 through the gaps between said frame and the glass 7002.

Other structures, being the same as in the embodiment 4, will not be explained further.

[Embodiment 10]

Figure 9:
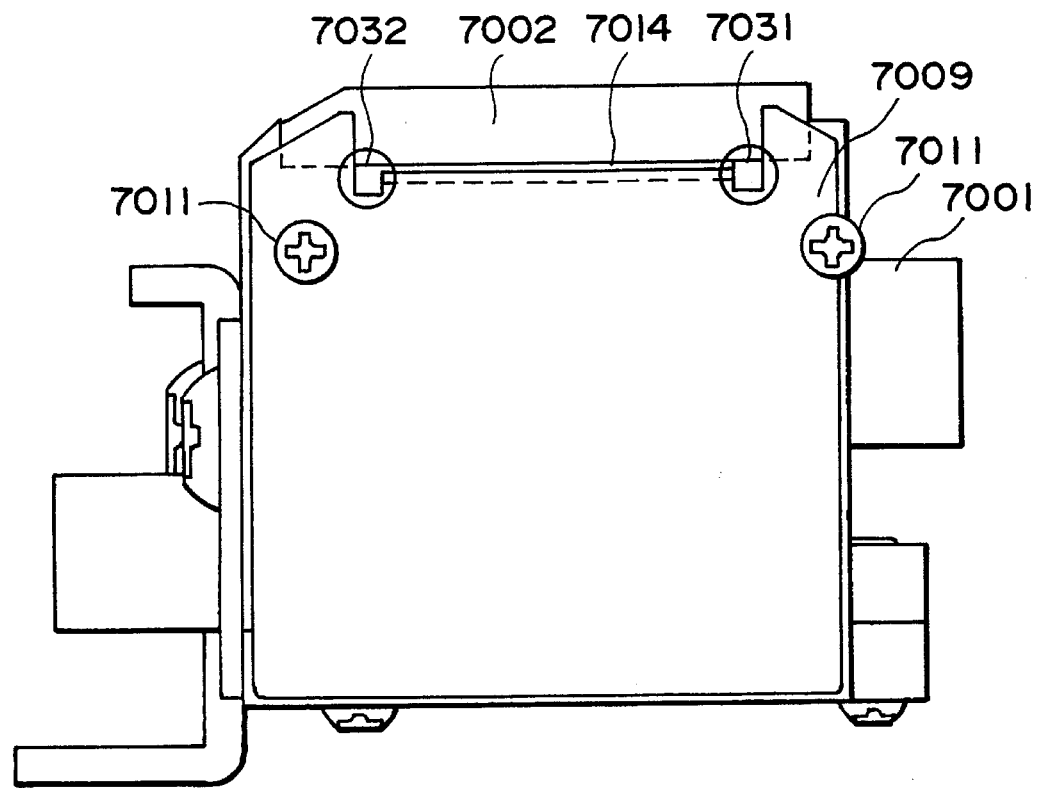
FIG. 9 is a schematic lateral view of a contact image sensor constituting still another embodiment of the present invention.

In the structures in the embodiments 4 to 9, gaps 7031, 7032 may be generated, as shown in FIG. 9, between the image reading glass 7002 and the frame 7001 or the lateral plates 7009, 7010, because of eventual bending of said lateral plates or of dimensional fluctuations in the components. Said gaps 7031, 7032 are filled with an incompletely solidifiable filler, whereby there can be prevented undesirable effects on the image, resulting from intrusion of dusts such as paper powder into the frame 7001 through the gaps around the image reading glass, without hindering the movement of said glass resulting from expansion or shrinkage thereof.

Other structures, being the same as in the embodiment 4, will not be explained further.

[Embodiment 11]

In the embodiment 10 based on the structures of the embodiments 5 to 9, the incompletely solidifiable adhesive material used for the adhesion of the reading glass 7002 can also be used as the filler for the gaps 7031, 7032. Such structure avoids complication in the assembling process resulting from the use of another filler, thereby leading to a cost reduction.

Other structures, being same as in the embodiment 4, will not be explained further.

Also, the contact image sensor units constructed as explained above can be utilized, as explained in the foregoing, in various information processing apparatus such as a facsimile apparatus, an image reader or the like.

The image sensors of the foregoing embodiments 4 to 11 can be applied, as those of the embodiments 1 to 3, to the image information processing apparatus shown as an example in FIG. 6.

The apparatus shown in FIG. 6 has already been explained in the foregoing, and will not, therefore, be explained further.

As detailedly explained in the foregoing, the present invention provides the following advantages:

the focus margin can be enlarged because the image reading glass is not lifted from the frame at the mounting thereto;

the image reading glass can be protected from destruction, as the eventual movement of the glass with respect to the frame resulting from a temperature change can be absorbed;

undesirable effects on the image resulting from intrusion of dusts such as paper powder can be prevented because of reduced gaps between the image reading glass and the frame or the lateral plates; and because there are no protruding portions above the reading face of the image reading glass, an original wider than the frame length can be passed freely, and a wider tolerance is obtained for skewed advancement for an original the width of which is narrower than but close to the frame length.

What is claimed is:

1. A contact image sensor comprising:

a protective member including a light transmitting area;

illumination means for illuminating an original, bearing image information thereon, through said protective member;

a photosensor device for reading said image information;

imaging means for focusing light reflected from said original onto said photosensor device;

support means for integrally supporting said illumination means, said photosensor device, and said imaging means; and an elastic adhesive member for joining together said protective member and said support means, said elastic adhesive member having an elasticity permitting an amount of deformation of at least 0.016 mm per 1 cm of the longitudinal length thereof.

2. A contact image sensor according to claim 1, wherein a gap is formed between said protective member and a said plate of said support means.

3. A contact image sensor according to claim 2, wherein said gap is filled with said elastic adhesive member to join said protective member to said support means.

4. A contact image sensor according to claim 1, wherein a concave joint section is formed between said protective member and said support means.

5. An information processing apparatus comprising:

a contact image sensor including a protective member having a light transmitting area; illumination means for illuminating an original, bearing image information thereon, through said protective member; a photosensor device for reading said image information; imaging means for focusing light reflected from said original onto said photosensor device, wherein an elastic adhesive member is provided for joining together said protective member and said support means, said elastic adhesive member having an elasticity permitting an amount of deformation of at least 0.016 mm per 1 cm of the longitudinal length thereof;

original support means for supporting said original at a reading position;

sensor driver means for driving said contact image sensor; and sensor support means for supporting said contact image sensor in a fixed or a movable manner.

6. An information processing apparatus according to claim 5, further comprising recording means.

7. An information processing apparatus according to claim 6, wherein said recording means is of an ink jet recording type.

8. An information processing apparatus according to claim 7, wherein said recording means utilizes an electrothermal converting member to cause liquid discharge utilizing thermal energy.

9. An information processing apparatus according to claim 6, wherein said recording means is of a cartridge type.

10. An information processing apparatus according to claim 6, wherein said recording means is of a chip type.

11. A contact image sensor comprising:

a protective member including a light transmitting area;

illumination means for illuminating an original, bearing image information thereon, through said protective member;

a photosensor device for reading said image information;

imaging means for focusing light reflected from said original onto said photosensor device; and support means for integrally supporting said illumination means, said photosensor device, and said imaging means;

wherein a part of said protective member other than an image reading face thereof is joined to said support means with a first adhesive, while at least an end portion of said protective member other than the image reading face thereof is joined to a lateral plate mounted on an end portion of said support means with said first adhesive, said first adhesive being discontinuous at least between the part and the end portion of said protective member, and wherein said lateral plate has elasticity at least in a direction for absorbing displacement of said protective member in a direction connecting said part of said protective member and said end portion of said support means.

12. A contact image sensor according to claim 11, wherein said lateral plate has a deformation of not less than M: wherein $M=|\alpha_1-\alpha_2|\times 1000$, wherein $\alpha_1$, $\alpha_2$ are linear expansion coefficients of materials respectively comprising said protective member and said supporting means.

13. A contact image sensor according to claim 11, wherein said protective member is biased in a direction opposite to the image reading face of said protective member.

14. A contact image sensor according to claim 11, wherein contact surfaces between said protective member and said support means, except for portions joined by said first adhesive, are also joined together by a second adhesive which has an adhering force weaker than that of said first adhesive.

15. An information processing apparatus comprising:

a contact image sensor including a protective member having a light transmitting area; illumination means for illuminating an original, bearing image information thereon, through said protective member; a photosensor device for reading said image information; imaging means for focusing light reflected from said original onto said photosensor device; and support means for integrally supporting said illumination means, said photosensor device, and said imaging means; wherein a part of said protective member other than an image reading face thereof is joined to said support means by a first adhesive, while at least an end portion of said protective member other than the image reading face thereof is joined by the first adhesive to a lateral plate mounted on an end portion of said support means, said first adhesive being discontinuous at least between the part and the end portion of said protective member; and wherein said lateral plate has elasticity at least in a direction for absorbing displacement of said protective member in a direction connecting said part of said protective member and said end portion of said protective member;

original support means for supporting said original in a reading position;

sensor driver means for driving said contact image sensor; and sensor support means for supporting said contact image sensor.

16. A contact image sensor according to claim 15, wherein said lateral plate has a deformation of not less than M per 1 cm; wherein $M=|\alpha_1-\alpha_2|\times 1000$, $\alpha_1$ and $\alpha_2$ are linear expansion coefficients of materials respectively comprising said protective member and said supporting means.

17. An information processing apparatus according to claim 14, further comprising recording means.

18. An information processing apparatus according to claim 17, wherein said recording means is of an ink jet recording type.

19. An information processing apparatus according to claim 18, wherein said recording means utilizes an electrothermal converting member to cause liquid discharge utilizing thermal energy.

20. An information processing apparatus according to claim 17, wherein said recording means is of a cartridge type.

21. An information processing apparatus according to claim 17, wherein said recording means is of a chip type.

22. A contact image sensor comprising:

a protective member including a light transmitting area;

illumination means for illuminating an original, bearing image information thereon, through said protective member;

a photosensor device for reading said image information;

imaging means for focusing light reflected from said original onto said photosensor device;

support means for integrally supporting said illumination means, said photosensor device, and said imaging means;

wherein said protective member and said support means are joined together at a central portion in a longitudinal direction thereof and at both ends of said protective member; and an elastic adhesive member for joining together said both ends of said protective member, said elastic adhesive member having an elasticity permitting an amount of deformation of at least 0.008 mm per 1 cm of the longitudinal length thereof.

23. A contact image sensor according to claim 22, wherein said protective member is biased in a direction opposite to an image reading face of said protective member.

24. A contact image sensor according to claim 22, wherein contact surfaces between said protective member and said support means, excluding the joined parts, are filled with a filler.

25. An information processing apparatus comprising:

a contact image sensor including a protective member having a light transmitting area; illumination means for illuminating an original, bearing image information thereon, through said protective member; a photosensor device for reading said image information; imaging means for focusing light reflected from said original onto said photosensor device; support means for integrally support said illumination means, said photosensor device and said imaging means; wherein said protective member and said support means are joined together at a central portion in a longitudinal direction thereof and at both ends of said protective member; and an elastic adhesive member for joining together said both ends of said protective member, said elastic adhesive member having an elasticity permitting an amount of deformation of at least 0.008 mm per 1 cm of the longitudinal length thereof;

original support means for supporting said original in a reading position;

sensor driver means for driving said contact image sensor; and sensor support means for supporting said contact image sensor.

26. An information processing apparatus according to claim 25, further comprising recording means.

27. An information processing apparatus according to claim 26, wherein said recording means is of an ink jet recording type.

28. An information processing apparatus according to claim 27, wherein said recording type means utilizes an electrothermal converting means to cause liquid discharge utilizing thermal energy.

29. An information processing apparatus according to claim 26, wherein said recording means is of a cartridge type.

30. An information processing apparatus according to claim 26, wherein said recording means is of a chip type.

31. A contact image sensor comprising:

a protective member including a light transmitting area;

illumination means for illuminating an original, bearing image information thereon, through said protective member;

a photosensor device for reading said image information;

imaging means for focusing light reflected from said original onto said photosensor device; and support means for integrally supporting said illumination means, said photosensor device, and said imaging means;

wherein a part of said protective member other than an image reading face thereof is joined to said support means with a first adhesive, while at least an end portion of said protective member other than the image reading face thereof is joined to a lateral plate mounted on an end portion of said support means with said first adhesive, and wherein said lateral plate has elasticity at least in a direction for absorbing displacement of said protective member in a direction connecting said part of said protective member and said end portion of said support means, and wherein said lateral plate has a deformation of not less than M: wherein $M=|\alpha_1-\alpha_2|\times 1000$, wherein $\alpha_1$, $\alpha_2$ are linear expansion coefficients of materials respectively comprising said protective member and said supporting means, and wherein M=0.016 mm.

32. An information processing apparatus comprising:

a contact image sensor including a protective member having a light transmitting area; illumination means for illuminating an original, bearing image information thereon, through said protective member; a photosensor device for reading said image information; imaging means for focusing light reflected from said original onto said photosensor device; and support means for integrally supporting said illumination means, said photosensor device, and said imaging means; wherein a part of said protective member other than an image reading face thereof is joined to said support means by a first adhesive, while at least an end portion of said protective member other than the image reading face thereof is joined by the first adhesive to a lateral plate mounted on an end portion of said support means; and wherein said lateral plate has elasticity at least in a direction for absorbing displacement of said protective member in a direction connecting said part of said protective member and said end portion of some protective member;

original support means for supporting said original in a reading position;

sensor driver means for driving said contact image sensor; and sensor support means for supporting said contact image sensor, and wherein said lateral plate has a deformation of not less than M per 1 cm; wherein $M=|\alpha_1-\alpha_2|\times 1000$, $\alpha_1$ and $\alpha_2$ are linear expansion coefficients of materials respectively comprising said protective member and said supporting means, wherein M=0.016 mm.

33. A contact type image sensor comprising:

a protective member including a light transmitting area;

an illumination means for illuminating an original, bearing image information thereon, through said protective member;

a photosensor device for reading the image information;

an imaging means for focusing light reflected from the original onto said photosensor device;

a supporting means for integrally supporting said illumination means, said photosensor device, and said imaging means;

a lateral plate disposed on an end of said supporting means; and an adhesive member for joining together (i) said supporting means and a substantially central portion of said protective member, in a longitudinal direction thereof, outside of an image reading region, and (ii) at least one end of said protective member outside of the image reading region and said lateral plate, said adhesive member being arranged discontinuously, wherein said lateral plate has an elasticity for absorbing a shift of said protective member in a direction from the central portion of the protective member toward the end of said protective member.

34. A contact image sensor according to claim 33, wherein said lateral plate has a deformation of not less than M per 1 cm, wherein $M=|\alpha_1-\alpha_2|\times 1000$, $\alpha_1$ and $\alpha_2$ are linear expansion coefficients of materials respectively comprising said protective member and said supporting means.

35. A contact type image sensor comprising:

a protective member including a light transmitting area;

an illumination means for illuminating an original, bearing image information thereon, through said protective member;

a photosensor device for reading the image information;

an imaging means for focusing light reflected from the original onto said photosensor device;

a supporting means for integrally supporting said illumination means, said photosensor device, and said imaging means;

a lateral plate disposed on an end of said supporting means; and an adhesive member for joining together (i) said supporting means and a substantially central portion of said protective member, in a longitudinal direction thereof, outside of an image reading region, and (ii) at least one end of said protective member outside of the image reading region and said lateral plate, wherein said lateral plate has an elasticity for absorbing a shift of said protective member in a direction from the central portion of the protective member toward the end of said protective member, and wherein said lateral plate has a deformation of not less than M per 1 cm, wherein $M=|\alpha_1-\alpha_2|\times 1000$, $\alpha_1$ and $\alpha_2$ are linear expansion coefficients of materials respectively comprising said protective member and said supporting means, and wherein M=0.008 mm.

36. A contact type image sensor comprising:

a protective member including a light transmitting area;

an illumination means for illuminating an original, bearing image information thereon, through said protective member;

a photosensor device for reading the image information;

an imaging means for focusing light reflected from the original onto said photosensor device;

a supporting means for integrally supporting said illumination means, said photosensor device, and said imaging means;

a lateral plate disposed on an end of said supporting means; and an adhesive member for joining together (i) said supporting means and a substantially central portion of said protective member, in a longitudinal direction thereof, outside of an image reading region, and (ii) at least one end of said protective member outside of the image reading region and said lateral plate, wherein said lateral plate has an elasticity for absorbing a shift of said protective member in a direction from the central portion of the protective member toward the end of said protective member, and wherein said adhesive material permits deformation of not less than 0.008 mm per 1 cm.

37. An information processing apparatus comprising:

a contact image sensor comprising:

a protective member including a light transmitting area;

an illumination means for illuminating an original, bearing image information thereon, through said protective member;

a photosensor device for reading the image information;

imaging means for focusing light reflected from the original onto said photosensor device;

a supporting means for integrally supporting said illumination means, said photosensor device and said imaging means;

a lateral plate disposed on an end of said supporting means; and an adhesive member for joining together (i) said supporting means and a substantially central portion of said protective member, in a longitudinal direction thereof, outside of an image reading region, and (ii) at least an end of said protective member outside of the image reading region and said lateral plate, and wherein said lateral plate has an elasticity for absorbing a shift of said protective member in a direction from the central portion of the protective member toward the end of said protective member, said adhesive member being arranged discontinuously.

38. An information processing apparatus according to claim 37, further comprising recording means.

39. A contact image sensor according to claim 37, wherein said lateral plate has a deformation of not less than M per 1 cm, wherein $M=|\alpha_1-\alpha_2|\times 1000$, $\alpha_1$ and $\alpha_2$ are linear expansion coefficients of materials respectively comprising said protective member and said supporting means.

40. An information processing apparatus according to claim 38, wherein said recording means comprises an ink jet recording means.

41. An information processing apparatus according to claim 40, wherein said ink jet recording means comprises electrothermal converting means to cause liquid discharge using thermal energy.

42. An information processing apparatus according to claim 38, wherein said recording means comprises a cartridge recording means.

43. An information processing apparatus according to claim 38, wherein said recording means comprises a chip recording means.

44. An information processing apparatus comprising:

a contact image sensor comprising:

a protective member including a light transmitting area; an illumination means for illuminating an original, bearing image information thereon, through said protective member; a photosensor device for reading the image information; and imaging means for focusing light reflected from the original onto said photosensor device; a supporting means for integrally supporting said illumination means, said photosensor device and said imaging means; a lateral plate disposed on an end of said supporting means; and an adhesive member for joining together (i) said supporting means and a substantially central portion of said protective member, in a longitudinal direction thereof, outside of an image reading region, and (ii) at least an end of said protective member outside of the image reading region and said lateral plate, and wherein said lateral plate has an elasticity for absorbing a shift of said protective member in a direction from the central portion of the protective member toward the end of said protective member, wherein said lateral plate has a deformation of not less than M per 1 cm, wherein $M=|\alpha_1-\alpha_2|\times 1000$, $\alpha_1$ and $\alpha_2$ are linear expansion coefficients of materials respectively comprising said protective member and said supporting means, and wherein M=0.008 mm.

45. An information processing apparatus comprising:

a contact image sensor comprising:

a protective member including a light transmitting area; an illumination means for illuminating an original, bearing image information thereon, through said protective member; a photosensor device for reading the image information; and imaging means for focusing light reflected from the original onto said photosensor device; a supporting means for integrally supporting said illumination means, said photosensor device and said imaging means; a lateral plate disposed on an end of said supporting means; and an adhesive member for joining together (i) said supporting means and a substantially central portion of said protective member, in a longitudinal direction thereof, outside of an image reading region, and (ii) at least an end of said protective member outside of the image reading region and said lateral plate, and wherein said lateral plate has an elasticity for absorbing a shift of said protective member in a direction from the central portion of the protective member toward the end of said protective member, and wherein said adhesive material permits deformation of not less than 0.008 mm per 1 cm.

* * * * *

UNITED STATES PATENT AND TRADEMARK OFFICE
CERTIFICATE OF CORRECTION

PATENT NO. : 5,517,329

DATED : May 14, 1996

INVENTORS : Haruo Ishizuka

It is certified that error appears in the above-identified patent and that said Letters Patent is hereby corrected as shown below:

COLUMN 5

Line 8, "M=|α1-α2x1000" should read --M=|α1-α2|x1000--.

COLUMN 9

Line 4, "discontinues" should read --discontinuous--, and
Line 30, "avoids" should read --avoids further--.

COLUMN 10

Line 13, "the boiling the liquid," should read --the liquid boiling point,--, and
Line 14, "paint" should be deleted.

COLUMN 11

Line 64, "to" should be deleted.

COLUMN 13

Line 10, "said" should read --side--.

COLUMN 14

Line 57, "claim 14," should read --claim 15,--.

UNITED STATES PATENT AND TRADEMARK OFFICE
CERTIFICATE OF CORRECTION

PATENT NO. : 5,517,329

DATED : May 14, 1996

INVENTORS : Haruo Ishizuki

It is certified that error appears in the above-identified patent and that said Letters Patent is hereby corrected as shown below:

<u>COLUMN 15</u>

Line 39, "support" should read --supporting--, and
Line 62, "type" should be deleted.

<u>COLUMN 19</u>

Line 15, "$M=|\alpha_1-\alpha_2 \times 1000,$" should read --$M=|\alpha_1-\alpha_2| \times 1000,$--.

Signed and Sealed this

Seventeenth Day of September, 1996

Attest:

BRUCE LEHMAN

*Attesting Officer*   *Commissioner of Patents and Trademarks*